United States Patent
Cantwell

(10) Patent No.: US 8,790,068 B2
(45) Date of Patent: Jul. 29, 2014

(54) LOW WIND, VERTICAL AXIS, DUAL STAGE, WIND TURBINE POWER GENERATOR

(76) Inventor: Larry Cantwell, Amargosa Valley, NV (US)

(*) Notice: Subject to any disclaimer, the term of this patent is extended or adjusted under 35 U.S.C. 154(b) by 695 days.

(21) Appl. No.: 12/715,394

(22) Filed: Mar. 2, 2010

(65) Prior Publication Data

US 2010/0230974 A1    Sep. 16, 2010

Related U.S. Application Data

(60) Provisional application No. 61/158,811, filed on Mar. 10, 2009.

(51) Int. Cl.
*F03D 3/02* (2006.01)
(52) U.S. Cl.
USPC .................. 415/4.2; 416/41; 290/55
(58) Field of Classification Search
USPC ........ 415/4.2, 4.4, 907, 909; 416/40, 41, 117, 416/118, 119
See application file for complete search history.

(56) References Cited

U.S. PATENT DOCUMENTS

| | | | | |
|---|---|---|---|---|
| 4,236,866 A * | 12/1980 | Zapata Martinez | ............ | 415/4.4 |
| 4,365,929 A * | 12/1982 | Retz | ............... | 415/53.1 |
| 4,486,143 A * | 12/1984 | McVey | ........................ | 415/164 |
| 4,551,631 A * | 11/1985 | Trigilio | ........................... | 290/55 |
| 4,935,639 A * | 6/1990 | Yeh | ................................. | 290/55 |
| 5,313,103 A * | 5/1994 | Hickey | ............................ | 290/54 |
| 5,336,933 A * | 8/1994 | Ernster | ............................ | 290/55 |
| 5,380,149 A * | 1/1995 | Valsamidis | .................... | 415/2.1 |
| 6,352,473 B1 * | 3/2002 | Clark | ............................... | 454/19 |
| 7,215,037 B2 * | 5/2007 | Scalzi | ............................. | 290/55 |
| 7,245,039 B2 * | 7/2007 | DuHamel | ....................... | 290/44 |
| 8,057,159 B2 * | 11/2011 | Chong | ........................... | 415/4.2 |
| 8,197,178 B1 * | 6/2012 | Chen | .............................. | 415/4.1 |

* cited by examiner

*Primary Examiner* — Edward Landrum
*Assistant Examiner* — Justin Seabe
(74) *Attorney, Agent, or Firm* — David L. Hoffman; Hoffman Patent Group

(57) ABSTRACT

The present disclosure describes a low-wind, dual-stage, vertical-axis, wind-generated power turbine comprising a structural support tower, at least four turbine assemblies stacked on top of one another within individual turbine bays, a central drive shaft connecting the turbine assemblies, a draft induction channel surrounding the drive shaft, a spiral blade running through the induction channel, a paddle turbine assembly at the base of the tower which propels the spiral blade, a blower source which powers the paddle turbine, a built-in solar system which feeds the blower, external, natural wind directional slats, and a high pressure, fluid-drive, Hydrabine turbine mechanically coupled to a transmission or CTV, coupled to a one Mega Watt output generator.

16 Claims, 8 Drawing Sheets

LOW WIND, VERTICAL AXIS, DUAL STAGE, WIND TURBINE POWER GENERATOR

CROSS REFERENCE TO RELATED APPLICATIONS

This application is related to and claims the benefit of 35 U.S.C. §111(b) and the filing dates of provisional application 61/158,811 entitled LOW WIND, VERTICL AXIS, DUAL STAGE, WIND TURBINE POWER GENERATOR filed Mar. 10, 2009, the content of which is hereby incorporated by reference for all purposes.

FIELD OF INVENTION

The present invention relates to the field of power generation. More specifically, the invention relates to renewable power generation in low wind environments by vertical wind turbine.

BACKGROUND OF THE INVENTION

Wind is a clean, renewable energy source that, until now, has been primarily unreliable. This is due to the fact that existing wind turbine devices cannot generate adequate power from wind blowing less than five miles per hour or from winds that continually change direction. The United States is currently the world's leading energy market and wind energy represents only 1.5% of all U.S. power generation, with a goal of 20% by 2030. Other major suppliers of energy have tried to harness the power of coal, natural gas and nuclear energy, which are less environmentally conscious. Additional sources include solar power, bio-fuels and hydrogen power but these methods are still either largely undeveloped or costly.

The presently disclosed vertical-axis wind turbine overcomes all of these problems by providing a clean, renewable energy source that offers a low cost per unit and is extremely dependable. Recent testing has shown the present disclosure offers a 75% or more Capacity Utilization Factor (CUF), whereas traditional prop turbines only offer a CUF of 33%. To date, only nuclear power comes close to offering the same reliability, but at a much greater cost. According to a recent cost comparison published by the US Federal Energy Regulatory Commission's Office of Enforcement, the cost to produce wind energy lies in the middle range of energy costs at $1,500-$2,500 per kilowatt hour (kWh), gas at $500-$1,500 per kWh and nuclear at $4,500-$7,500 per kWh. As will be seen, the present disclosure is also less expensive to construct, operate and maintain, requires a smaller carbon footprint and generates at least 227% more energy than a traditional prop wind turbine.

A few previous solutions, with different structure and operation have been suggested to alleviate this problem. For example, U.S. Pat. No. 4,052,134 discloses a Vertical Axis Wind Turbine Motor that operate off a vertical axis by generating power from wind that strikes both the inward and outward side of upright vanes. This is traditionally how vertical axis wind turbines have been designed, however the present disclosure disembarks from such a design in several ways, for one by employing an outer structure comprising a plurality of controllable wind direction slats. The present disclosure also comprises blades that rotate around turbines which do not directly attach to or swing from the central axis.

In another example, U.S. Pat. No. 6,749,399 entitled Vertical Array Wind Turbine discloses a wind turbine with an array of rotors arranged at various heights, which resemble a tree with various branches. This patent lacks many of the structures and features of the present disclosure including, but not limited to a paddle turbine located at the base of the structure or the ability to run from solar power. This patent also lacks a feature of the prior art mentioned above and the present disclosure which is the ability to use power from wind blowing from more than one direction.

SUMMARY OF THE INVENTION

The present disclosure describes a low-wind, dual-stage, vertical-axis, wind-generated power turbine. The turbine provides a constant power output in nearly any wind condition primarily due to a dual stage turbine system and the ability to harness the power from both wind and the sun. Additionally, the small size of this vertical-axis turbine offers an environmentally conscious, low carbon footprint solution to the world's energy problems at an operation cost less than any other on the market today.

Structurally, the device comprises a structural support tower, at least four turbine assemblies, stacked on top of one another within individual turbine bays, which are connected by a central drive shaft. One or more of these assemblies can be added to the tower, adding approximately 25 feet each to the total height of the tower. The assemblies themselves further comprise multiple blade assemblies which further comprise multiple wing assemblies to capture any moving air. A draft induction channel surrounding the drive shaft allows air from a lower level paddle turbine to blow air up through the tower that ultimately escapes through the top or is recirculated through ducting back into the turbine bays.

While in the channel, this air encounters a spiral blade which rotates, pushing additional air upward through the channel and the surrounding turbines. The paddle turbine assembly itself is powered through a blower which can be powered in one of many ways including a built-in solar unit. Preferably, the paddle turbine will comprise blades proportional in size to the other turbines and be housed in a ground-level electro-mechanical control room. External, natural-wind directional slats surround the tower and the control room which direct and accelerate any natural wind onto the blade assemblies of the individual turbine assemblies. Based on sensing units and calculations performed in the control room, these slats can be electronically controlled and even be shut, thereby completely encasing the tower from hazardous conditions. The slats may also be mounted in a stationary position.

The external air on the individual turbines combined with the draft induction system has been proven to form a vortex within the structure which incrementally amplifies the system's power. Ultimately, all the blade's power and torque are transferred through the central drive shaft and into a high pressure, fluid-drive, Hydrabine Turbine which is mechanically coupled to an output generator. The generator has been shown to produce a constant minimum of one Mega Watt of power in almost any natural wind condition.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
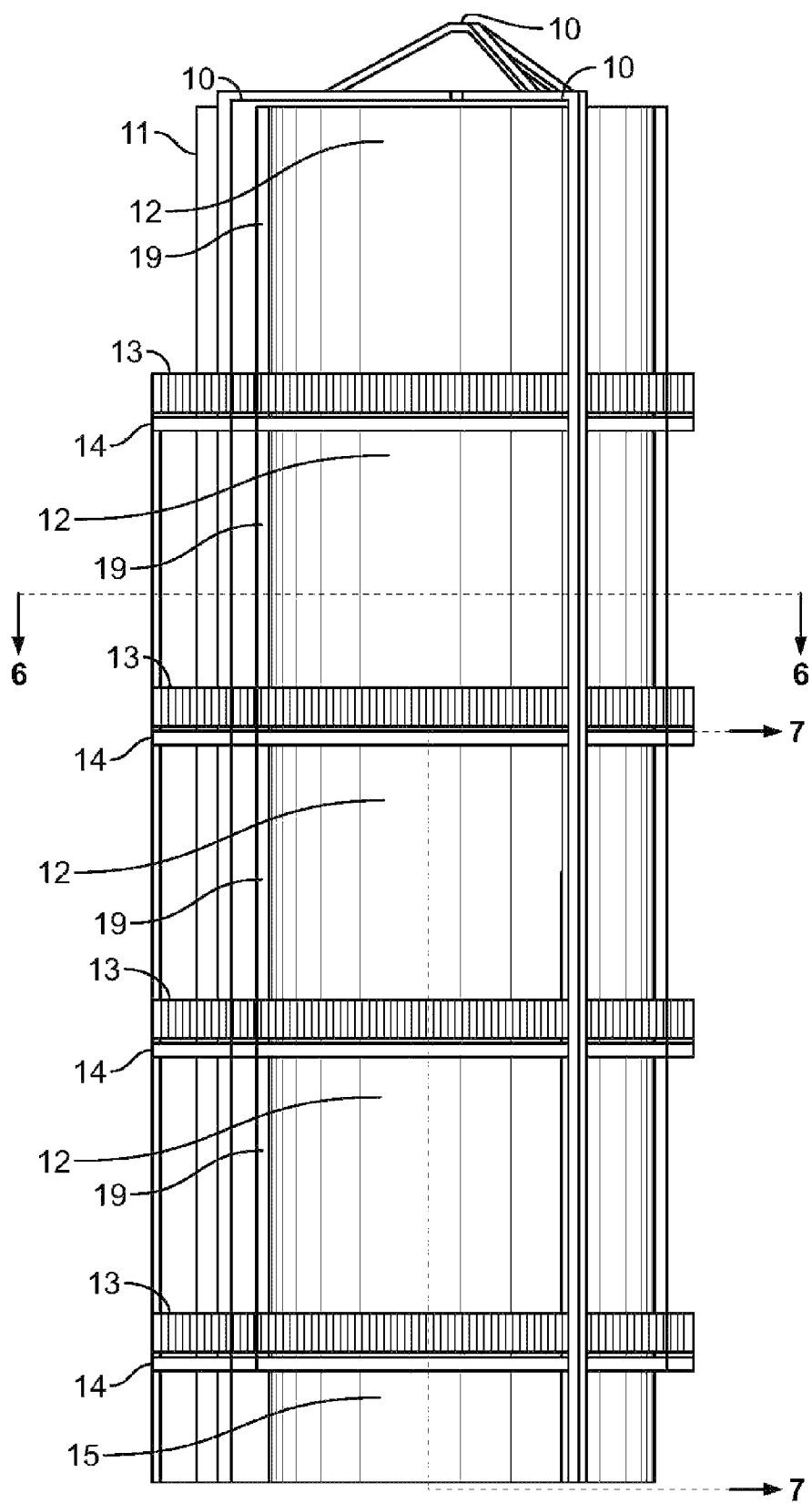
FIG. 1 illustrates an elevation view of the preferred embodiment of the present invention.

In the following description of the various embodiments, reference is made to the accompanying drawings, which form a part hereof, and in which is shown by way of illustration, various embodiments in which the invention may be practiced. It is to be understood that other embodiments may still be utilized and structural and functional modifications may be made without departing from the scope and spirit of the present invention.

Design and Operational Overview

The presently disclosed vertical axis wind turbine is a design concept that allows for the production of grid-quality power to occur in any condition of wind, including wind speeds of less than five miles per hour (mph). In the preferred embodiment, the wind turbine is driven by three energy sources, with the first source, natural wind, being the least consistent, but also the least required source of energy. As will be shown infra, in the present disclosure, natural wind enters a tower structure through specialized wind direction slats, where wind speed is accelerated and directed toward main turbine blades. The second source is a paddle turbine assembly that is located in the ground floor mechanical room and attached to the main shaft. This device accepts a high volume of pressurized air from a blower assembly, which in turn drives several large paddle-style blades located inside a horizontal housing. The blower can be traditionally grid powered, but is preferably solar powered. The energy generated from those paddle blades is transferred to both the first main turbine assembly directly and also to the main shaft which sets all of the turbine assemblies in motion. The high volume of pressurized air is then vented into the center of the tower through a draft induction channel where it makes contact with a spiral blade partially located inside the draft induction channel. The third source of energy is the spiral blade itself, which also drives the main turbines, even when natural wind energy falls below a threshold normally required for power production.

Through operation, warm air is drawn from the lower mechanical room and mixed with exterior air for input into the high volume blower. By forcing air into the draft induction channel in the center of each main turbine assembly, a vortex of rapid rising air is forced against the surface of the spiral blade, which also drives the main turbine assemblies. As each main turbine rotates within its turbine bay, the turbine blade assemblies create a low-pressure zone within the turbine bays, which draws exterior air over, and through the wind direction slats. Exterior air is accelerated slightly as it follows a path over the wind direction slats, onto the main turbine blade tip, along the blade surface and then finally being drawn into the draft induction channel, where the air travels upward into the induction channel of the next main turbine assembly and so on until the high volume of high pressure air is exhausted out the top of the entire structure. On the way up, this air also makes contact with, and drives two booster fan blades in each turbine bay; one located at the bottom and one located at the top of each bay. The booster fans are attached to the main shaft and also assist in keeping the main turbines rotating. They also add to the torque output factor of the main assembly.

In the mechanical room, a large diameter main drive wheel is attached to the main shaft and the outer edge drives a smaller drive wheel, which is attached to a high pressure fluid pump assembly. The two drive wheels are connected by gearing, belt, chain and/or fluid drive and are reduced from 1:20 to 1:35 ratios depending on torque requirements. The fluid pumps then drive the Hydrabine Turbine, which is a multi blade assembly that utilizes a multiple of extremely high pressure, dual jet nozzles to drive a high speed balanced turbine wheel assembly supported by a main output shaft and bearing assembly. The Hydrabine Turbine is coupled to a multi level mechanical shift or CVT transmission assembly which in turn drives the main output generator.

The present disclosure is structured and operates differently from a standard turbine design because (1) the tower structure is designed with separate turbine bays; (2) the tower structure is shorter than most with a minimum height of 110 feet; (3) multiple bearings support and control large lateral loads; (4) wing assemblies of each blade of each turbine are separate pieces for ease in repair, replacement and transporting; (5) additional fans are located at the top and bottom of each turbine bay; (6) the entire device is a dual stage unit, with the individual turbine blades receiving energy from both natural wind (which creates a vortex) and the spiral blade located within the draft induction channel; (7) the spiral blade itself being powered by a paddle turbine, which in turn is powered by a blower assembly when natural wind falls below a required threshold; (8) the exterior slats are stationary or electronically adjustable and shaped to accelerate natural wind; (9) the system assures that the main shaft will be in constant rotation at a suitable revolution per minute (rpm) regardless of the natural wind speed; (10) an electronic modulating control maintains the rpms by reducing the draft induction air volume as natural wind speed increases, and increases the draft induction air volume as natural wind speed decreases; (11) the blower is optionally powered by a built in solar system instead of grid power; and (12) a 12 amp backup power supply from the grid can also provide additional energy in times of low light and wind. A device as herein described will out perform standard wind turbines because the main turbines are kept rotating regardless of natural wind conditions, which keeps the generator producing constant power with a greater than 75% efficiency factor, even in the absence of natural wind.

Structure

Referring to FIG. 1, main support structure 10 takes a steel tripod shape with main support beams laid out as triangles, to form a pyramid extending vertically from the ground to the top of the tower. Caged access ladder 11 surrounds support structure 10 and the full circumference of the tower. In the preferred embodiment, the tower is comprised of four turbine assemblies 12, each twenty-five feet in height and located within their individual turbine bays. Of course, additional turbine assemblies could be stacked on top of one another, adding to the total power output and height of the tower, in places where it is allowable. Safety hand rail 13 and catwalk 14 also surround the entire exterior circumference of the tower and form the majority of the service platform. Mechanical/electrical control room 15 is located on the ground level with its exterior walls concentric with the entire tower.

Wind direction slats 19 are located on the exterior of each turbine bay and the exterior of mechanical control room 15. In the preferred embodiment, slats 19 are uniform in arrangement from ground level to the top deck and installed completely 360 degrees around the circumference of the tower. They can be stationary, controlled individually or controlled bay-by-bay. Slats 19 are preferably three feet wide and pitched at a determined angle, usually 15.5 degrees but up to 90 degrees, to accommodate wind speeds unique to a geographic location. The pitch of slats 19 are preferably electronically controlled from room 15. They will normally be in an open position until wind speeds reach a maximum threshold of sixty mph, whereby slats 19 will begin to close. Once wind speeds decrease to a minimum threshold of fifty-five mph, slats 19 will begin to open again. Slats 19 are also shaped so that the speed of natural wind passing over them can be increased. The purpose of wind direction slats 19 is to direct and accelerate any natural wind toward the tip of the main turbine blades. They indirectly control main turbine rotation direction and also create a "venturi" effect by accelerating any air passing over and between each slat 19 before making contact with any turbine blades.

Figure 2:
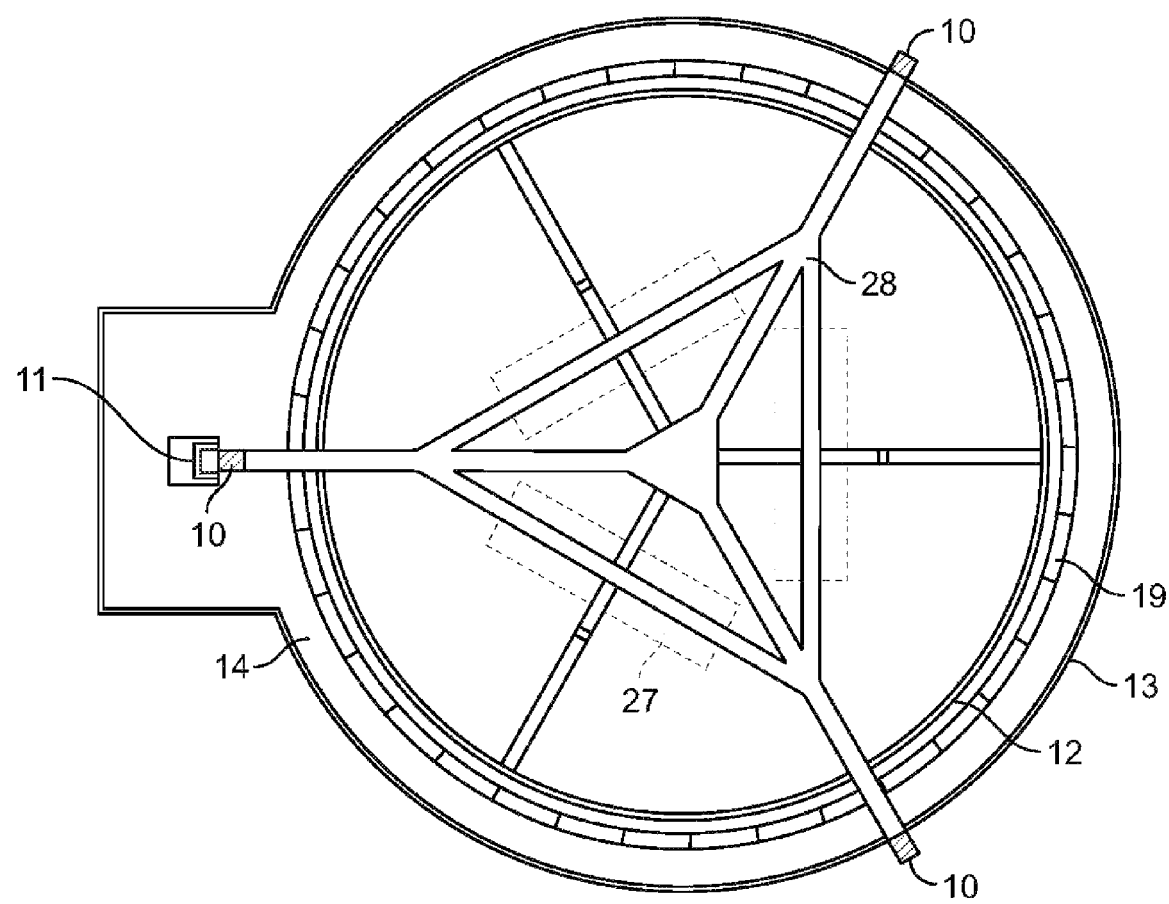
FIG. 2 illustrates an overall plan view of the preferred embodiment of the present invention.

Now referring to FIG. 2, an overall plan view is shown again including support structure 10, access ladder 11 on the outside of one main support beam, main turbine assembly 12 located inside each turbine bay, safety handrail 13, catwalk 14 and wind direction slats 19. In one embodiment of the present disclosure, each turbine assembly 12 comprises a frame and a multitude of blade structures, each comprised of a multitude of wing assemblies.

Additionally, solar panels 27 are shown which are not commonly used in conjunction with vertical wind turbines. In this disclosure, solar panels 27 generate enough energy to power the blower assembly (not yet shown) which thrusts air at 23,00 to 45,000 cubic feet per minute upward. One reason for this is to begin turning paddle turbine (not yet shown), which in the preferred embodiment consists of thirty, six-foot blades. Thus power from solar panels 27 can effectively replace the traditional 12 amps of grid power used to run a 10 horse-power motor power controls and communication in mechanical room 15. Although, the present disclosure can also be powered by an auxiliary 10 kw generator with propane tank or the like. Solar panels 27 can be any solar energy devices known in the art, including but not limited to solar tubing. Support for solar panels 27 is provided by horizontal bracing 28 which also provides main bearing support.

Figure 3:
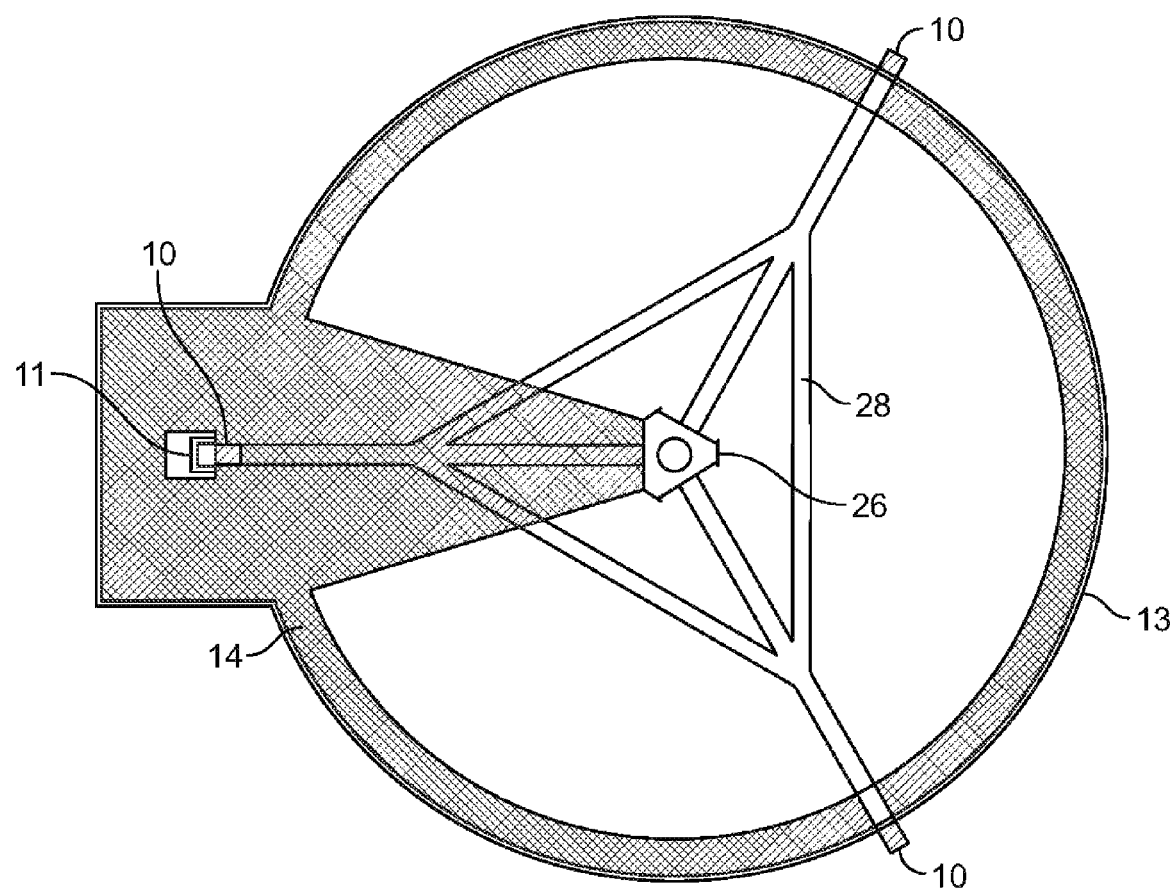
FIG. 3 illustrates a plan view of the floor and service deck of the preferred embodiment of the present invention.

Now referring to FIG. 3, another plan view is shown illustrating the floor and service deck. Again, structural support 10 can be seen in an equilateral triangle shape. In this preferred embodiment, structure 10 is created from steel I-beam type posts but could be made in any support arrangements or from any materials known in the art. Access ladder 11, handrail 13 and catwalk 14 are also shown again in this figure to fill seven feet of the complete 42 foot diameter. In alternate embodiments, the width of the tower and turbine bays may vary. All of these structures are designed to meet all foreign and domestic safety regulations. Main turbine drive shaft is made to engage with turbine drive hubs 26 in the center of structural support 10. Hubs 26 also allow the turbine frame to connect with the main drive shaft. Horizontal truss bracing 28 can also be seen attaching to structural support 10 and inward to the center of each turbine bay, which restricts lateral movement of the entire tower and supports the main shaft and main bearing assemblies.

Figure 4:
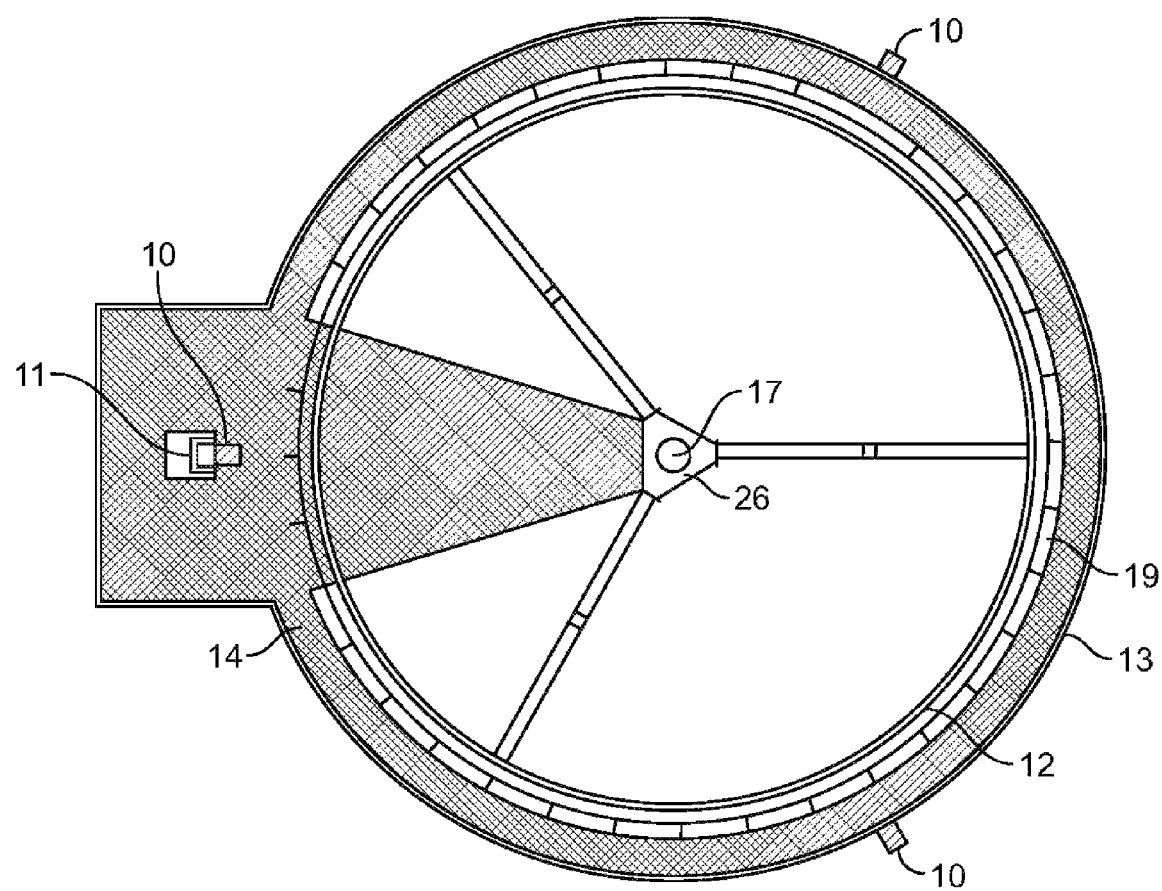
FIG. 4 illustrates a plan view of the service deck with an exemplary turbine of the preferred embodiment of the present invention.

Now referring to FIG. 4, another plan view is shown illustrating the deck plan. Besides support 10, ladder 11, main turbine assembly 12, handrail 13, catwalk 14, and hubs 26, this view exceptionally shows main turbine drive shaft 17, which starts in mechanical room 15 (not shown) and ends on the top deck. Also wind direction slats 19 are shown which again assist in determining the directional rotation of individual turbine assembly 12 and prevent negative forces on opposing blades.

Figure 5:
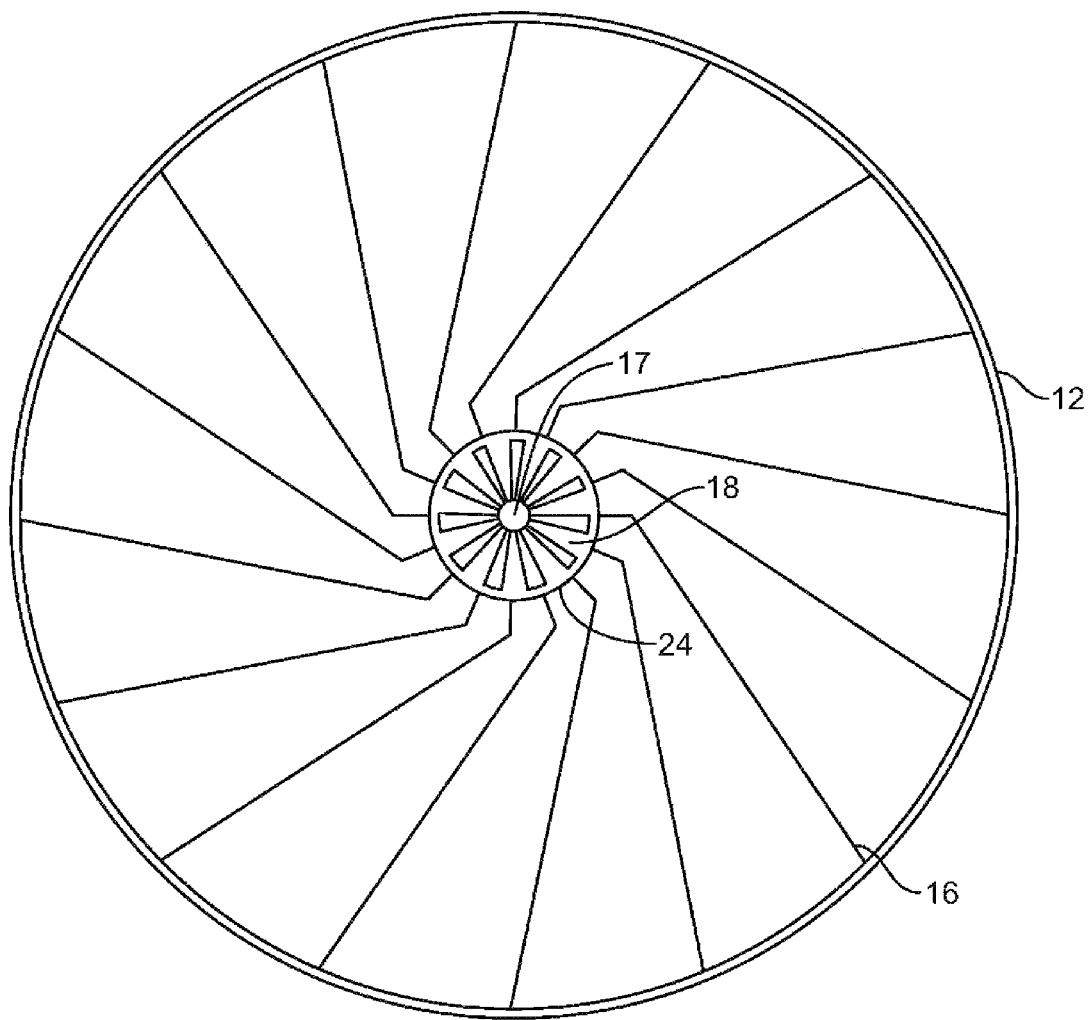
FIG. 5 illustrates a plan view of the turbine of the preferred embodiment of the present invention.

Now referring to FIG. 5, a turbine plan view is shown which best representatively illustrates the individual parts of this specific turbine assembly 12. Each main turbine assembly 12 comprises a multitude of blade assemblies 16. In turn, each blade assembly 16 comprises a multitude of wing assemblies (not shown). Main turbine shaft assembly 17 can be seen in the center, as is true of all turbine bays. Most importantly, spiral blade is illustrated at least partially inside draft induction channel 18, adjacent to draft induction booster fan assembly 24, which is locate at the top and bottom of each bay's draft induction channel 18. In this preferred embodiment, draft induction channel 18 has a five foot diameter, inside turbine assembly 12's thirty-five foot diameter.

Figure 6:
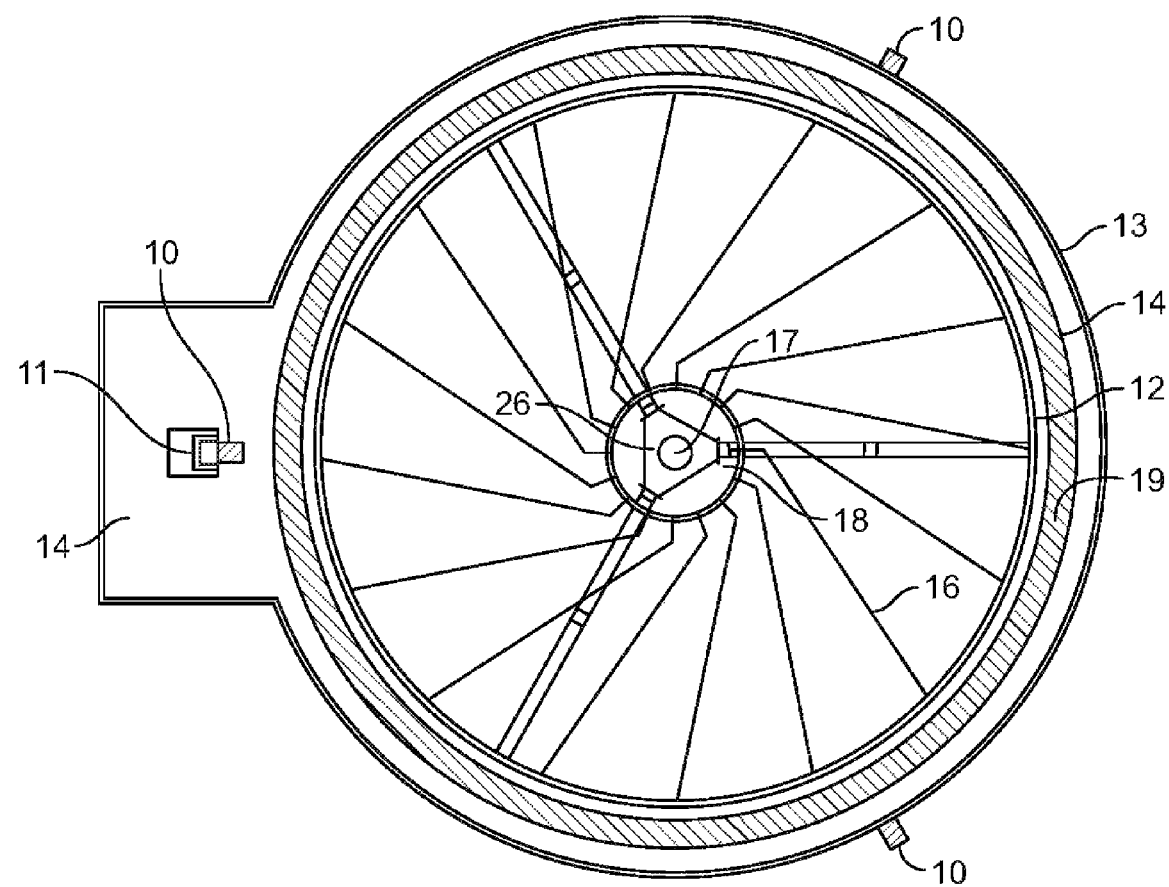
FIG. 6 illustrates a cross sectional view across line "6" in FIG. 1 of the preferred embodiment of the present invention.

Now referring to FIG. 6, a cross section along line "6" of the tower is shown. Again, structural support 10, ladder 11, turbine assembly 12, handrail 13, service deck catwalk 14, blade assembly 16, main turbine shaft 17, draft induction channel 18, slats 19 and drive hubs 26 are illustrated. This figure best depicts an overall cross section of the present disclosure.

Figure 7:
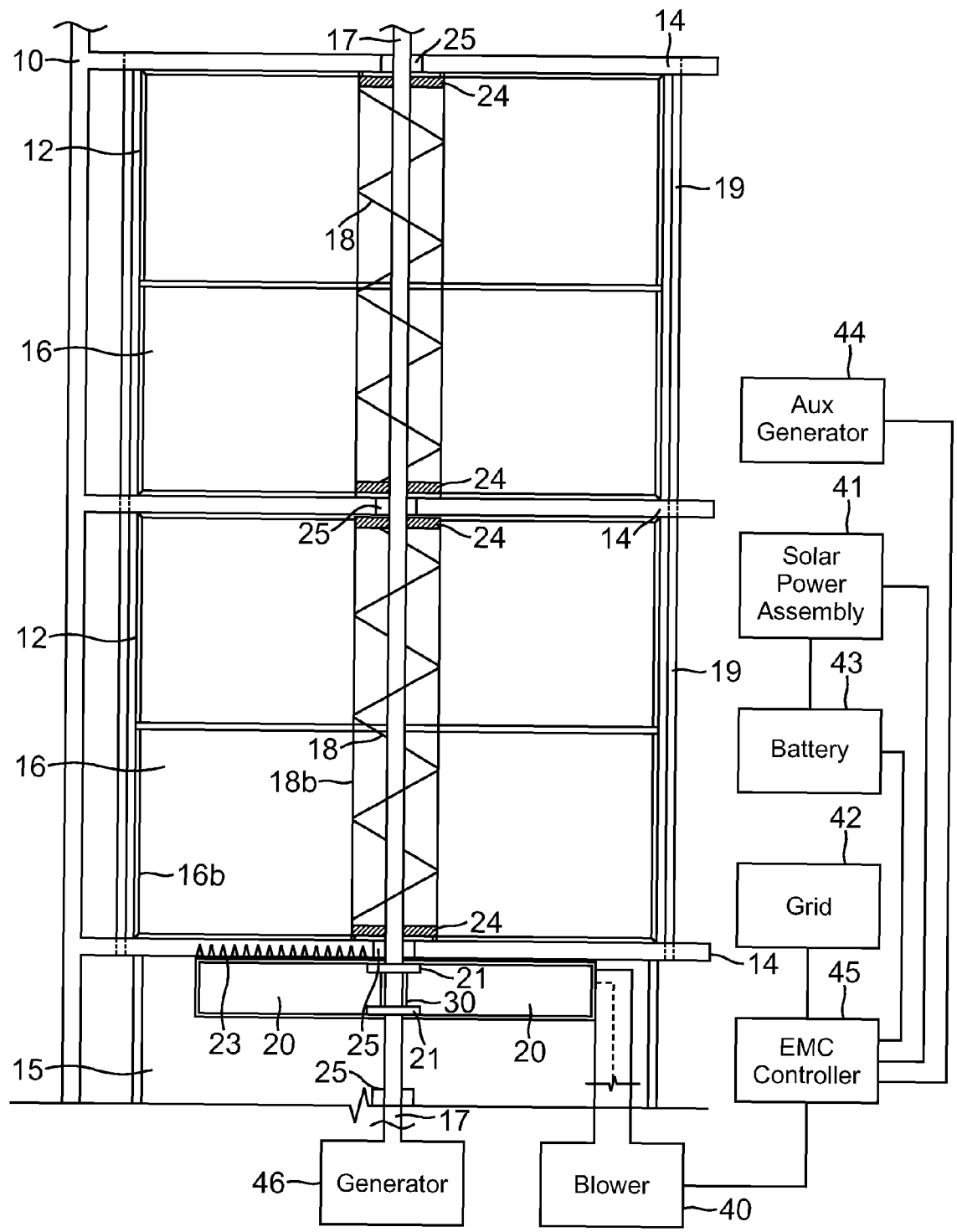
FIG. 7 illustrates a partial cross sectional view across line "7" of FIG. 1 of the preferred embodiment of the present invention.

Now, referring to FIG. 7, a cross section along line "7" of the main turbine assembly is shown. This figure best illustrates the tower sectioned off into four turbine assemblies 12 with individual blades 16. Surrounding these individual units is support structure 10 which reaches vertically up the perimeter of the tower. At the top of the figure, bearing housings 25 can be seen which houses bearings to support main shaft 17 and to minimize the lateral loads to main shaft 17 and turbine assemblies 12, which circumnavigate draft induction channel 18. The service deck platform and catwalk 14 can be seen at the edges of the tower. Uniformly arranged wind direction slats 19 appear down the sides and mechanical room 15 sits at the bottom. Additionally, novel paddle turbine 20 is represented by a box at the bottom of the figure. As described supra, paddle turbine 20 provides a source of energy that consistently drives the main shaft 17 and turbines 12 when natural wind speed drops below the startup and operational threshold. Paddle turbine 20 receives an extra volume of high pressure air from a blower 40. The blower 40 may be electrically connected to a solar power capturing assembly 41, an electrical grid 42, an auxiliary generator 44, and a battery 43. An electronic modulating control 45 may be connected between the blower and the various power sources to determine the power source being used and to modulate the power to the blower 40. The blower 40 operates on power provided by a solar power capturing assembly 41, very low current drawn from the electrical grid 42, a battery 43, an auxiliary generator 44, or a combination. The battery 43 may be electrically connected to the solar power capturing assembly 41 to charge the battery with power from the solar power capturing assembly 41. Power to the blower 40 can be decreased by the electronic modulating control 45 if wind speeds are greater than a minimum threshold of five mph and increased if from any of the sources mentioned above if wind speeds are below the minimum threshold of five mph. Paddle turbine 20 is attached to main shaft 17 and keeps all the turbines 12 rotating regardless of wind speed. Main shaft 17 is coupled to an output power generator 46. Inside paddle turbine 20, are paddle hubs 21. Directional fins 23 are located on top of paddle turbine housing and direct high-volume, high velocity air onto the blades of the lowest turbine 12 and into induction channel 18 for the purpose of moving the spiral blade and other turbines 12. In one embodiment, the lowest turbine 12 may have fewer, larger surface area blades than the rest in order to compensate for this direct force from the blower. This may be true proportionally of all turbines 12 while moving upward through the tower. Additionally, fans 24 help to accelerate and direct the draft induction air into and up through draft induction channel 18 until the air is finally exhausted out the top of the tower or redirected back into the turbine bays.

Referring to all the figures and the disclosure as a whole, main drive shaft 17 supports all turbine assemblies and transfers the torque from them to a high pressure pump system via a variety of drive system options known in the art. The high pressure pump system drives the Hydrabine, fluid drive, power accelerator turbine. The power accelerator turbine, or HFDPAT then drives the output generator, which can produce 100 kW-1.5 MW of power depending on the number and diameter of blade assemblies and turbine bays within the structure.

Figure 8:
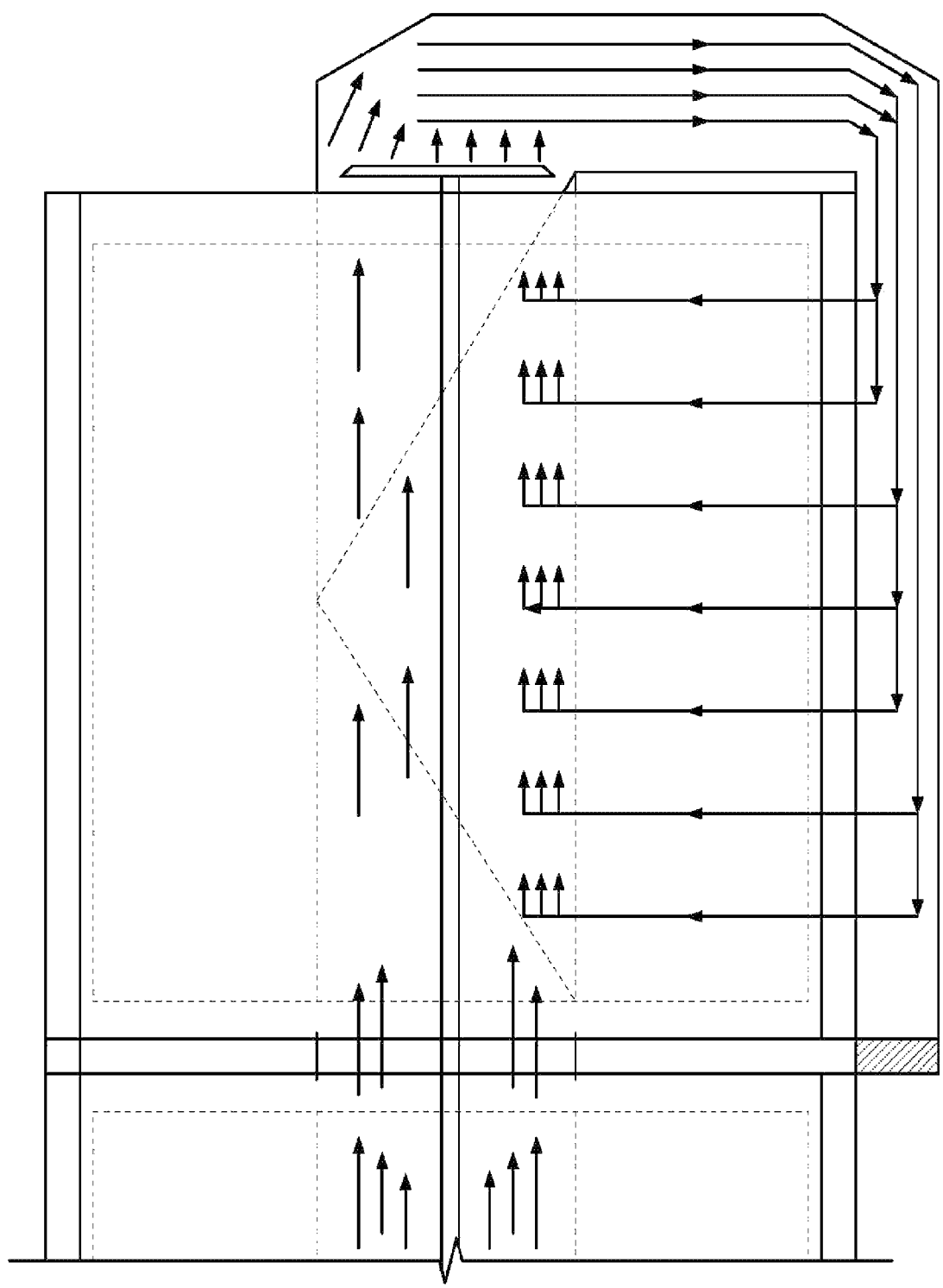
FIG. 8 illustrates an elevation view of an alternate embodiment of the present invention showing air that is vented from the top of the structure being recirculated back to the side of the structure.

Finally, referring to FIG. 8, an alternate embodiment of the present invention is disclosed showing the circulation of air through the device. As can be seen, air is driven both upward from the base of the structure and inward from the side of the structure. Additionally, in this embodiment, the air does not necessarily exit out the top of the structure, but is redirected back around the side of the structure to join exterior air which may be entering from the side. As is true of the preferred embodiment illustrated previously, air flows upward through the draft induction channel past the spiral blade and multiple turbine assemblies.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described apparatus. Thus, the spirit and scope of the invention should be construed broadly as set forth in the previous specification or appended claims.

What is claimed is:

1. A low-wind, vertical-axis wind turbine power generator comprising:
    a support tower having a centrally located assembly comprising a drive shaft therein;
    turbine means for rotating in response to wind, the turbine means being mounted to the drive shaft for rotation therewith;
    a paddle turbine assembly located at the base of the support tower and attached to the drive shaft for rotation therewith;
    a power generator coupled to the drive shaft for producing an output in response to rotation of the drive shaft;
    a blower mechanism for providing forced air to rotate the paddle turbine assembly resulting in rotation of the drive shaft even when the turbine means is not being rotated by the wind and even when the wind is blowing below a sufficient amount to achieve a predetermined minimum output of energy, thereby generating energy even when the wind is not blowing sufficiently to rotate the turbine means to produce at least at least the predetermined minimum output from the generator in response to rotation of the drive shaft,
    wherein the wind turbine power generator further comprises a battery configured to power the blower, and a solar energy capturing assembly configured to store captured energy in the battery for powering the blower,
    wherein the blower is connected to an electrical grid for selectively powering the blower, and
    wherein the wind turbine power generator further comprises an electronic controller for maintaining rotation of the vertical drive shaft by increasing power to the blower during periods of insufficient wind to rotate the turbine means to generate energy from the power generator to a desired threshold and decreasing power to the blower during periods of wind sufficient to rotate the turbine means to generate energy from the power generator to at least the desired threshold, and
    wherein the paddle turbine is enclosed and disposed below the turbine means and receives the blower air via a conduit.

2. The wind turbine power generator of claim 1 wherein the turbine structure comprises at least four turbine means stacked vertically.

3. The wind turbine power generator of claim 1, further comprising an auxiliary generator configured to power the blower.

4. The wind turbine power generator of claim 1, further comprising a plurality of wind direction slats located on an exterior surface of the support tower, said slats configured to direct wind toward the turbine means.

5. The wind turbine power generator of claim 1, wherein the centrally located assembly further comprises a draft induction channel surrounding the drive shaft.

6. The wind turbine power generator of claim 5, further comprising a plurality of wind direction slats located on an exterior surface of the support tower, said slats configured to direct wind toward the turbine means;
    wherein rotation of the turbine means creates a low-pressure zone drawing additional air through and over the wind direction slats and into the draft induction channel.

7. The wind turbine power generator of claim 6, wherein the centrally located assembly further comprises a helical blade attached to the drive shaft and surrounded by the draft induction channel, said helical blade configured to rotate in response to upward air movement within the induction channel.

8. The wind turbine power generator of claim 7, wherein the wind turbine power generator further comprises means for directing excess air from the blower mechanism and paddle turbine assembly into the draft induction channel to force rotation of the helical blade.

9. The wind turbine power generator of claim 1, wherein the paddle turbine assembly is disposed in a housing.

10. A low-wind, vertical-axis wind turbine power generator comprising:
    a central vertical drive shaft operatively coupled to a power capturing generator for producing electrical energy;
    a wind turbine assembly attached to the drive shaft;
    the wind turbine assembly comprising a plurality of turbine blades configured to be pushed by natural wind to rotate said wind turbine assembly and thereby rotate said drive shaft;
    a plurality of wind direction slats positioned about the circumference of the turbine assembly, said slats configured to direct natural wind toward the plurality of turbine blades to rotate the turbine assembly;

a paddle turbine assembly attached to the drive shaft;

a power source powering a blower mechanism;

wherein said blower mechanism is configured to provide forced air to rotate the paddle turbine assembly such that the drive shaft is rotated to cause the generator to produce at least a predetermined minimum output in response to rotation of the drive shaft even when the wind is not blowing sufficiently to rotate the turbine assembly, wherein the wind turbine power generator further comprises a battery configured to power the blower, and a solar energy capturing assembly configured to store captured energy in the battery for powering the blower, wherein the blower is connected to an electrical grid for selectively powering the blower, and wherein the wind turbine power generator further comprises an electronic controller for maintaining rotation of the vertical drive shaft by increasing power to the blower during periods of insufficient wind to rotate the turbine means to generate energy from the power generator to a desired threshold and decreasing power to the blower during periods of wind sufficient to rotate the turbine means to generate energy from the power generator to at least the desired threshold, and wherein the paddle turbine is enclosed and disposed below the wind turbine blades and receives the blower air via a conduit.

11. The wind turbine power generator of claim 10, further comprising a draft induction channel surrounding the drive shaft.

12. The wind turbine power generator of claim 11, further comprising a helical blade attached to the drive shaft inside the draft induction channel.

13. The wind turbine power generator of claim 10 wherein the paddle turbine assembly is disposed in a housing.

14. A method for generating power from a vertical axis wind turbine comprising the steps of:

using wind to rotate a wind turbine assembly attached to a vertical drive shaft, said drive shaft attached to a power capturing generator;

using a paddle turbine assembly attached to the drive shaft to rotate the drive shaft when there is insufficient wind to rotate the turbine assembly such that the generator produces at least a predetermined minimum output in response to rotation of the drive shaft;

wherein the secondary paddle turbine assembly is rotated by forced air from a blower selectively powered by at least one of a rechargeable battery, a solar energy capturing assembly, an auxiliary generator, and an electrical grid such that the generator produces at least the predetermined minimum output even though there is insufficient wind to produce the predetermined minimum output, and wherein the paddle turbine assembly is disposed in a housing, and the step of rotating the paddle turbine assembly comprises blowing the forced air onto the paddle turbine assembly located in the housing, wherein the battery is configured to power the blower, and a solar energy capturing assembly is configured to store captured energy in the battery for powering the blower, and the blower is connected to an electrical grid for selectively powering the blower, and wherein the wind turbine power generator further comprises an electronic controller, and there is a step of maintaining rotation of the vertical drive shaft by increasing power to the blower during periods of insufficient wind to rotate the wind turbine assembly to generate energy from the power generator to a desired threshold and decreasing power to the blower during periods of wind sufficient to rotate the wind turbine assembly to generate energy from the power generator to at least the desired threshold, and wherein the paddle turbine is enclosed and disposed below the wind turbine assembly and receives the blower air via a conduit.

15. The method of claim 14, further comprising the steps of directing wind onto the wind turbine assembly using a plurality of wind direction slats.

16. The method of claim 15, further comprising the steps of directing the forced air from the blower to rotate a helical blade attached to the drive shaft and surrounded by an induction channel to rotate the drive shaft when there is insufficient natural wind to rotate the wind turbine assembly.

\* \* \* \* \*